3,514,186
WIDE ANGLE OPTICAL APPARATUS
Eugene F. Poncelet, 1560 Mariposa Ave.,
Palo Alto, Calif. 94306
Filed Apr. 10, 1968, Ser. No. 720,238
Int. Cl. G02b 13/06
U.S. Cl. 350—176                                                         5 Claims

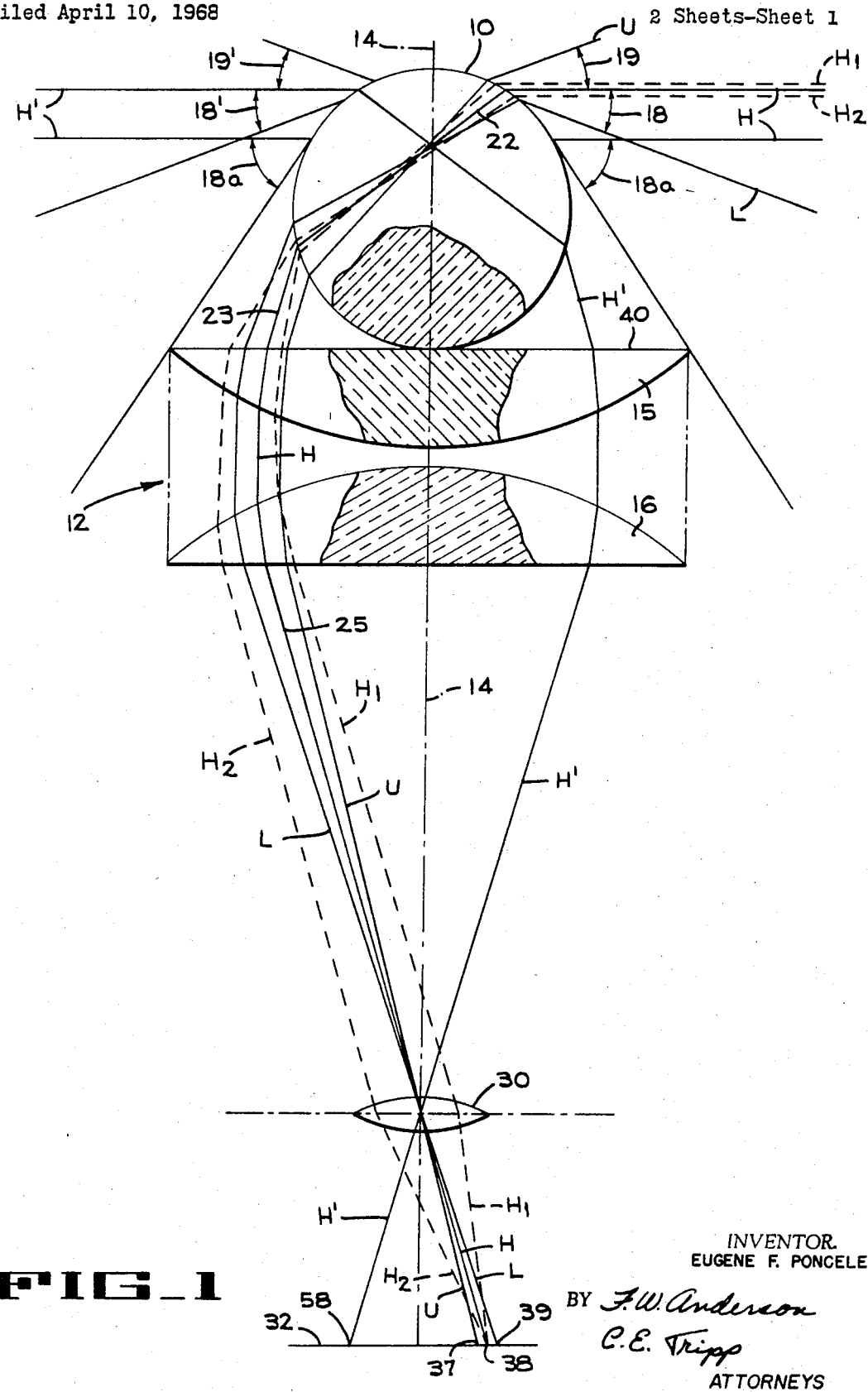

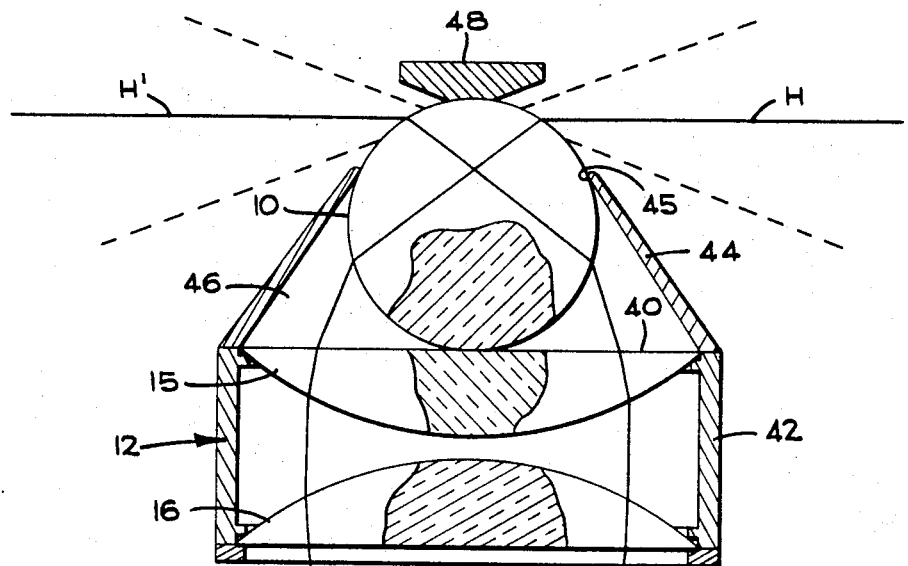

ABSTRACT OF THE DISCLOSURE

An optical system having a very wide angle of view, greater than 180°, is constituted by a sphere of high index of refraction followed by a closely adjacent positive lens of large diameter, such that a perimeter band seen by the sphere is convertible to an annular image of the band on a flat surface, by a camera-type lens in optical sequence with the system. Normal distortion of the sphere is inherently corrected by the system, which is useful in a periscopic or like viewer, for observing or recording objects both above and below the horizon around a perimeter of 360°.

BACKGROUND OF THE INVENTION

Field of the invention

This invention relates to wide angle optical devices or lens systems and in a particularly important aspect to perimeter viewing apparatus, i.e. for optical observation of a field which extends around the light-receiving or entering end of the system, e.g. a field which may usefully extend a full 360°, representing an observable band that has portions both above and below a horizon that represents a view angle of 90° to the principal optical axis. That is to say, the invention in this specific aspect extends to perimeter viewers, which have a very wide angle of view in the sense of a wide angle lens, so as to see, in effect, in a direction beyond a right angle to the axis, and in such manner entirely around the axis, and the invention extends to novel optical systems and components serving in such apparatus. Examples of employment of a perimeter viewer are situations where it is desired to observe, photograph or otherwise translate a scene extending around most or all of the perimeter of the observing station, as in circumstances where direct observation of the scene is not feasible or desirable, e.g. for periscopic inspection or for unmanned recording or transmission, and where all or nearly all parts of such a perimeter are to be simultaneously viewed or recorded.

A particular object of the invention is to provide new apparatus and components therefor, achieving results which in effect represent those of a lens having an angle of view greater than 180°, i.e. a half-angle greater than 90°, while utilizing relatively simple and easily designed components and yet obtaining an image which may be desirably free of distortion, especially at or near the extremity of the angle of view where observation of a perimeter band is desired. A further object is to provide new and unusually effective systems as described, which are adapted for convenient visual observation, as well as for photographic recording or other translation or transmission of the imaged view. A basic object is the attainment of these results in a system functioning by refraction in its principal components, i.e. utilizing what is in effect a lens system of novel arrangement and configuration.

Description of the prior art

Wide angle lenses have had a long historical development, including utilization of so-called reverse telephoto lens systems employing, in such reverse order, a negative member at the front, followed by a positive member, to afford a high-aperture, wide angle lens with a long back focus and a short focal length. Such lenses have been made to view essentially an entire hemisphere, but with large distortion that is tolerable only for limited purposes.

In addition to so-called sky or fish-eye lenses as just described, other very wide angle systems have been designed. For example, one form of lens has comprised a central positive member mounted between two extremely large negative components, yielding a system which may cover substantially a full hemisphere but which, because of its oversize dimensions, is applicable only to short focal lengths. For the latter reason such lenses are not conveniently useful for perimeter viewing. Moreover, a true perimeter band is not usefully achieved for most purposes with a lens having a half-angle of view only up to about 90°, especially where the device is required to see nearby or other objects that are in effect below the horizon.

While it has been theoretically suggested that a lens of a field coverage substantially greater than 180°, e.g. perhaps approximately 240°, might be constituted by a high index sphere, practical realization of such results has not eventuated. In particular, distortion, notably barrel distortion, is so severe that only about 170° of the theoretical field is useable and recognizable; hence it does not appear that there has been realization or development of a refractive optical system effectively covering a field greater than about 170° to 180°, or a system of such sort having special utility for perimeter viewing.

SUMMARY OF THE INVENTION

For the provision of a wide angle optical device, and especially a device effective at half-angles, to the optical axis, in a range extending beyond as well as within 90°, the present invention involves a novel combination of refracting elements functioning as lenses, namely a sphere having an index of refraction of at least about 1.8 and preferably 2, together with a positive, i.e. converging lens element arranged in at least extremely close proximity to the sphere and having a diameter larger than the sphere, the sphere thus constituting the front element, conveniently abutted at its rear face by the positive lens which constitutes the second element. The mutual disposition and sizes of the elements are furthermore such that rays received by the sphere of angles of 90° or more to the optical axis of the assembly, and refracted by the sphere through portions of its rearward hemispherical surface, are received by the positive element and refracted by the latter in directions which are more or less inclined toward the axis. The front face of the positive element, which may itself consist of more than one component, is very preferably plane or flat, or indeed may be concave, being in these respects definable as a substantially non-converging or a non-convex surface.

With such a system, and preferably using suitable supplemental lens means such as a photographic-type lens to project an image, or a lens appropriate for visual viewing, or both, it is possible to obtain a view which represents objects at the extremities of a very wide angle across the front or observing surface of the sphere, and which affords, in an annular image or arrangement, a panoramic view of the entire perimeter scene around the sphere (or as much of such scene as is desired), covering at all points a band of observation which is disposed at the stated wide angle to the optical axis. Stated more simply, the system when arranged for example in a vertical position achieves a view of the entire perimeter around the horizon, significantly including objects both below as well as above such horizon, e.g. at least about 10° and preferably 15° or more on each side of a half-angle of 90°, the theoretical maximum angle increasing as the index of refraction of the sphere increases. The scene is conveniently presented as an image on a plane, thus suitable for photographic or other translation, or may be visually seen in the same manner, being a circular or annular image including the horizon as a circle intermediate the inner and outer boundaries of the annulus.

While ordinarily a sphere, considered as a lens, exhibits severe distortion, especially of the so-called barrel type, the present system is desirably free of such distortion and transmits a view of the described perimeter band which is fully useable and recognizable. Whereas this wide angle perimeter area, when sought to be seen through the sphere alone, is so excessively compressed and so badly distorted as to be completely unuseable, the present system both relieves the compression and corrects the distortion, and thus in result increases the available portion of the field from a maximum of not more than about 170° across the optical axis, to 300° or thereabout, using an index of 2 for the sphere.

In presently preferred examples of the invention, the second, positive element can be such as to contribute further toward correction of distortion and elimination of other aberration such as color fringes, one form of such element being a pair of spaced plano-convex lenses arranged symmetrically with their convex surfaces facing each other, although useful results are nevertheless attainable with a single positive, e.g. plano-convex element of moderately short focal length. While conceivably the central portion of the field observable by the sphere, e.g. within say a total angle of 140° or a half-angle of 70° to the axis, may likewise be seen or projected, this area may still retain considerable barrel distortion and indeed for many purposes is of little or no interest. Hence, in describing essential features of the system hereinbelow, attention is mainly restricted to the defined perimeter band, which is in fact unusually wide, and in which distinctly new and useful results are attained.

Further features of a complete viewer according to the invention may include photographic-type or similar lens structure to project an image of the observed perimter scene on a plane surface for photographic reproduction or the like, or alternatively means for visually observing such image, as by employment of a penta prism or similar device, allowing observation from one side of the system, so as to see the perimeter band as projected, in effect, on a vertical surface. Other features, characteristics and results of the invention are set forth hereinbelow, in connection with the examples of the optical arrangement and structure illustrated in the drawings.

BRIEF DESCRIPTION OF THE DRAWINGS

FIG. 1 is a schematic view of the optical system of the invention arranged to project an image of a perimeter band or region on a plane surface;

FIG. 2 is a simplified representation of an image of a panoramic scene such as produced with the system of FIG. 1; and FIG. 3 is a simplified, vertical cross-section of a perimeter viewer basically involving the system of FIG. 1, but including, in diagram, instrumentalities for visual observation.

DETAILED DESCRIPTION

As shown in the diagram of FIG. 1, the basic, refracting components of the system comprise a sphere 10 and a positive element generally designated 12, behind and adjacent to the sphere, so that the optical axis 14 of the system is arranged vertically in this illustration. The glass or other transparent composition of the sphere is selected to have a very high index of refraction, e.g. at least approximately 1.8 and very preferably of a value of 2.0 or thereabout. While for limited purposes, the positive element 12 can be a simple plano-convex lens with its flat side next to the sphere, it is preferably a better-corrected or less distorting element such as constituted by the spaced pair of plano-convex lenses 15, 16 arranged, for example, as in a so-called condensing lens of the ordinary double type, with the space between the adjacent convex faces relatively small at the axis, e.g. less than one-half the maximum thickness of either component. It is also to be noted that the diameter of the element 12 is substantially greater than that of the sphere 10, for instance with an index of 2 for the sphere, the diameter of the plano-convex lenses should be no greater than $\sqrt{3}$ times the diameter of the sphere. A larger diameter lens would limit the field of view.

The basic function of the system is to observe a wide angle of view, e.g. as measured on both sides or across the optical axis, such angle being exemplified (with the axis vertical) by reference to the horizon, which is horizontal in the diagram as noted at the ray-lines H and H'. Indeed the effectiveness of the system extends substantially below the horizon, say about 20° below as indicated by the angles 18 or 18', while effective viewing is also obtained through a like angle 19 or 19' of about 20° above the horizon. For an index 2, the theoretical maximum is 60° below the horizon (angles 18a, FIG. 1). In other words, the total wide angle to be observed in this example of the system is 220°, also definable as a half-angle of 110°, this function being effected throughout an entire horizontal perimeter, extending through 360° in a plane perpendicular to the axis 14. More specifically, the view of special interest for the system is a perimeter band comprising rays entering the front surface of the sphere, i.e. the upper hemisphere in FIG. 1, at angles to the axis in a range, for example, of 70° to 110°, such view being obtainable, if desired, entirely around the sphere, e.g. in all horizontal directions. While as indicated above the system can also provide observation of objects directly facing the sphere, within the 70° angle, and indeed conceivably special means might be provided for correcting distortion in this area to the extent that the basic elements may be less than completely satisfactory in such respect, the invention is primarily concerned with perimeter band viewing even though imaging of the central area need not always be excluded from useful embodiments.

By way of general explanation, light rays such as a horizontal ray H entering the front hemisphere of the element 10 are refracted as indicated by the internal continuance of this ray at 22 and its line 23 of departure from the rear hemisphere. Such ray is received and refracted by the positive element 12 in a direction generally toward the axis 14, so as to be acceptable by suitable viewing means aligned with the axis and of a convenient size to receive useful bundles of rays from all parts of the desired field, the line of departure of the ray H from the lens 12 being indicated at 25. As will now be appreciated, the function of the sphere, especially as characterized with the stated high index of refraction, is to provide an image, preferably within the sphere, of an object in the viewing band; from each point of such image the rays diverge to the exit or rear surface, and leave such surface in a divergent condition, indeed a condition of what may be greater mutual divergence. The function of the positive lens 12 is then to receive these rays and produce a mutually converging effect among them, while also refracting them toward the optical axis 14. More specifically these effects of the lens 12 are to reduce the mutual divergence of rays from a single point of an object imaged in the sphere and to bend those rays, collectively, toward the axis 14.

While conceivably the lens 12 may be designed and circumstanced in these functions so as to effect actual convergence of the stated group of rays (from an object and image point) to a point, and thus to produce a real image at a locality appropriately rearward of the lens, the function of notably convenient and therefore preferred embodiments of the lens 12 is simply to refract the mutually divergent rays that originated at each object point, so that they are bent not merely to a state of parallelism with the axis, but in a general sense follow paths that intersect the axis.

In a simplified sense, the lens 12 can function in part as a magnifier of very large diameter for the image formed by and within the sphere, although more particularly for what is in effect a virtual image of such formed image, as presented by the rays (e.g. ray H at 23), leaving the rear surface of the sphere. The effect, thus, of the lens 12 can be considered as providing a further virtual image observable through the rear or exit surface of the lens, and appearing as at a location in a plane ahead of the sphere but observable within a transverse area of convenient diameter relative to the optical axis, e.g. as by looking through the lens 12 from its rear side. In point of fact, the function of the system is as well performed even if the rays from a single object point are converging to a real image (at a distance plane) after passing the lens 12, but the foregoing assumes that the parameters of the lens 12 are such (as they may conveniently be) that these rays are still slightly divergent or possibly parallel to each other, although they are all preferably inclined toward the axis.

Whereas the image viewed directly in the sphere, i.e. without the lens 12, is characterized by barrel distortion, the lens 12 may be readily chosen to have appropriate, corresponding pincushion distortion so as to yield a very considerable and effective correction, the mutual counter effet of the two phenomena of spherial aberration being to straighten the lines of the ultimate view through the described two-element system, with little or no remaining distortion of either type. Indeed a particular advantage of the combination is that simple lenses (of the nature of plano-convex or bi-convex elements) although they are ordinarily characterized by substantial pincushion distortion, especially in the outer areas of the field, may be successfully utilized in the present invention. Moreover, the lens 12 is found to relieve or to expand the compressed condition of the perimeter image formed by the sphere as viewed from the rear of the latter, these effects in correction of distortion and compression being indicated by the even spacing of rays (e.g. beyond the lens 12) from various parts of the field, as will be apparent from further description (below) of FIG. 1. While this explanation is highly simplified, it is believed to represent an important aspect of the function of practical embodiments of the invention.

To achieve the desired results in a practical manner, the further function of the positive lens 12 in collimating or directing the rays toward the axis is equally important, and for coacting realization of all of the foregoing functions of the system, the characterizations of a high index of refraction of the sphere, of a substantially greater diameter of the lens 12 than the diameter of the sphere, and the closeness of this lens to the rear boundary of the sphere, are mutually related features of critical significance, especially in order to afford good viewing of objects seen at and upwards of 90° to the optical axis.

While the perimeter scene can be observed directly by simply looking into the rear face of the lens 12, i.e., by observing outer areas of the latter, a special and further feature of the invention is its inclusion of, and its ready adaptability to, further viewing or imaging means that may be disposed on or along the axis 14. That is to say, instead of simply observing through the lens 12 or perhaps with the aid of a plane mirror close to the lens at an angle to the axis, means such as a further positive lens 30 may be employed to form a real image of the perimeter scene or objects at a suitable image plane 32 perpendicular to the axis 14. Since the combined effect of the system 10–12 is to yield rays which appear to come from objects more or less in a plane ahead of the lens 12 (being representative of a virtual image as seen through the latter) or which (if the lens 12 is of inherently short enough focus) may only come to a focus at a great distance, the lens 30 can be considered as functioning to bring such rays to a focus at a convenient plane 32, thereby producing an image on this plane.

For purposes of illustration the element 30 is shown in diagram as a simple lens, but it may conveniently be any good lens of appropriate freedom from distortion and abberations, such as a photographic lens of good quality, for example adapted to work at the usual remote distances. It should have an effective diameter for collecting all of the useful rays from the lens 12 and an appropriate focal length to permit reasonable, desired dimensions for the complete system and to yield an image of useful size on the plane 32, as for exposure there of a sensitized photographic surface. Indeed a preferred feature of the invention is that the system 10–12 can be used with what is essentially an ordinary camera, for direct photographic recording of the perimeter scene on film or other medium.

As a diagrammatic illustration, FIG. 2 indicates roughly the nature of the annular image 33 of such scene as formed at the plane 32, considering the central portion as omitted or blocked out and showing the view as occurring on both sides of the horizon represented by the dotted line 35. The perimeter band around the sphere 10 is thus displayed or projected as a flat annular band wherein objects at the bottom of the actual perimeter band appear at the outermost circumference.

For schematic explanation, FIG. 1 shows three selected rays which include those coming from angles respecttively 20° above (upper ray U) and 20° below (lower ray L) the horizon as designated by ray H, all of these rays being particularly selected as those which pass, in effect, through the optical center of the camera or projecting lens 30. As will be understood, no one of these is necessarily the central ray of a corresponding bundle from an object point, but they are selected, as above, to simplify illustration of the functioning of the complete system.

The paths of these rays, U, H and L are substantially as indicated in FIG. 1, to the point of their ultimate impingement on the plane 32, which may be the photographic film and such points may therefore be taken to be the points of focus for respective object points from which the rays originated. Thus for example all useable rays parallel to or diverging from the ray U, and considered to originate at a point of the object, are brought to ultimate focus at the point 37 while correspondingly other object points are focused at locations 38 and 39, being respectively the object points of which one ray in each case is indicated at H and L. As will be seen, the arrangement and disposition of the image is thus as schematically indicated in FIG. 2, lowermost portions of the view being at the outside 39' (ray L) and uppermost portions being at the inside 37' of the annulus (ray U).

While the image produced by the lens 30 may be utilized for other purposes, as for direct observation or for transmission by television, or may be subject to electronic image amplification by conventional means before utilization, the diagram of FIG. 1 suffices to illustrate the basic arrangement and effect of the viewing apparatus and its adaptability to a variety of uses. It particulrly illustrates the function of creating a satisfactory image of the perimeter band, further diagrammatic indication being shown by the supplemental rays $H_1$ and $H_2$, parallel to the ray H and thus representing the other rays from a distant object on the horizon. As will be noted, although these rays may ultimately still be mutually divergent from the rear face of the lens component 12, they are within the field of the lens 30 and are brought to the same point 38, i.e. to a focus with the ray H, on the plane 32.

The need for a large diameter and close position of the lens structure 12 will now be readily understood from the ray diagrams in FIG. 1. Indeed it will be apparent that any ray coming at a substantially greater angle below the horizon than ray L can only be usefully refracted by the sphere when such ray enters the latter at a substantially lower position than L, and will then follow a path (on leaving the sphere) that is outside the lens 12 or at least in effect is outside its working field of view. Indeed (with a system proportioned as shown for example in FIG. 1) while a useful bundle of rays parallel to ray L can be accommodated, even such a parallel ray if very substantially lower than L will be outside the grasp of lens 12.

Although it is conceivable that some small convexity of the entering or front face of the positive lens assembly 12 may be permitted, with the use of a correspondingly larger diameter, a special feature is that the front face 40 of this positive lens is plane or flat or indeed may be concave with some advantage. Thus the face 40 may be characterized as preferably being non-convex or non-converging, i.e., either substantially flat or concave. Likewise while some slight spacing between the sphere 10 and the lens assembly 12 may be tolerated, and notably so if the face 40 is concave, the arrangement (even in including such spacing) is generically definable as such that the rear boundary of the sphere surface lies within the cavity of the lens 15. In any event, it would appear that in embodiments of the sort presently contemplated any spacing between the rearmost point of the spherical surface (on the axis) and the lens assembly 12 of as much as one-fourth the diameter of the sphere would be deleteriously excessive. On the other hand, it is conceivable that the front face of the positive lens 12 could in effect be closer than the rear boundary of the sphere, e.g., by removal of a shallow polar zone of the sphere at its rear side, permitting the lens to be moved up while not interfering with passage of all useable rays. In such case, the front face of the positive lens is of course well within the positional definition of being not substantially rearward of the rearmost boundary of the spherical surface.

FIG. 3 illustrates a further modification and schematically indicates one example of various ways in which the basic assembly might be mounted or supported. Thus for example, the double condenser lens assembly 12 is carried by a surrounding cylindrical barrel 42 while a similar, upper encircling structure, preferably conical is indicated at 44, to engage the sphere at a locality 45 above its equator, i.e., below the zone for entering rays and above the zone for rays passing to the lens 12. Any structure of this sort, however, should leave an abundance of open or air space 46 adjacent the lower hemisphere, for the required ray travel between elements. The top of the sphere may also be covered as indicated by the cap 48 and indeed the entire assembly can be mounted with a requirement only for a relatively narrow viewing aperture, e.g., between the regions of the parts 45 and 48.

FIG. 3 also illustrates one means for visual observation of the perimeter view. Although other reflecting or like means may be employed, a penta prism 50 is here shown receiving light from an image formed by the rays that have traversed the lens 30 and have been brought to a focus on a ground glass screen 51 or the like, so as to effectuate reflection of rays from the image in a horizontal direction for visual observation as from a locality 52. Advantageously the device 50 may be a penta prism of ordinary or simple type, providing only two stages of reflection from the successive, silvered faces 53, 54 and providing no side-to-side reversal of the image. With this arrangement and assuming, for example, that the apparatus is employed in a vehicle or vessel where the observer at 52 is facing in the direction of travel, the annular image seen by such observer will have at the bottom 56 (FIG. 2), in erect position, the scene immediately ahead of such vehicle or vessel, while the scenes at the right and left will be correspondingly placed in the image, and the view to the rear will appear at the top region 57, in inverted position. As shown in FIG. 3, the ray H, representing the forward view is imaged on the screen at 38, while the corresponding ray H', of the view to the rear, appears in the image at 58 (see also FIG. 1). As traced in the penta prism 50, rays coming respectively from these points 38, 58 of the image (corresponding to H, H') and successively reflected by the surfaces 53, 54 emerge for observation at 56 (bottom) and 57 (top), i.e., as depicted in FIG. 2.

Other elements conventional for visual observation may be included, such as a magnifying eye lens 60, or a field lens (not shown) of a sort employed in reflex camera viewers at the locality of the screen 51 (for a sharp view without critical focusing), or both; indeed any of a variety of known optical means for visual inspection or enlargement of an image such as produced by the lens 30 may be employed. In a given case, the size of the image itself is governed by the focal length which the lens 30 is selected to have, for example longer for photographic reproduction in FIG. 1 than for the reflex viewing arrangement in FIG. 3. The focal ratio or relative aperture of the lens 30 is likewise governed by circumstances, larger openings being preferred; it is presently contemplated that selection can satisfactorily be made within a range normal for camera lenses, e.g., about $f/1.5$ to $f/4.5$, controlled by a stop at the optical center of the lens 30 (not shown), when the lens is a conventional multi-element lens system.

In the foregoing description the central part of the total field of the sphere has been disregarded, and although this region of view is not incapable of utilization, the system may include means such as the cap 48 or a further, central disk or light baffle (not shown), as between the elements 10, 15 or 15, 16, to block the center area.

By way of example of one embodiment of the invention as utilized for projecting an image of a perimeter band on a screen or photographic plate at the plane 32 of FIG. 1, the element 10 is a sphere having a diameter of three and one-half inches, made of a high lead oxide content glass, comprising about 90% PbO by weight, cleared of impurities; i.e., the heaviest flint glass. Thus glass has a refractive index of about 2.0. The positive element 12, placed in abutment with the rear surface of the sphere consists of two plano-convex lenses, each having an index of refraction of about 1.5, and arranged as shown in the manner of a double condensing lens. The total diameter of this element is six and one-quarter inches, presenting an effective diameter of six inches, the elements 15, 16 being spaced at their central concave regions by about five-sixteenths inch. This lens assembly, being symmetrical, has a principal focus of about five inches from each plane face. The camera lens 30 is a wide angle type lens for a 35 mm. camera with a focal length of about 35 mm. It may be noted that the lens system 12 can appropriately have an index of refraction of about 1.5; while conceivably lenses with a considerably higher or even lower index may be used.

Utilizing the components described, an annular image of the perimeter band viewed by the sphere 10 was received at the focal plane of the camera, the camera lens 30 being placed approximately fourteen inches along the axis 14 from the rear face of the lens 12, and the camera being focused to suit its association with the sphere-lens system 10–12. The image thus produced at 32 had an outside diameter of the reproduced annular band of about one inch, with an inner useable boundary of a diameter of about three-quarter inch, the intervening area representing the scene 20° above and below the horizon as observed by the sphere 10, through a complete 360° around the horizon. Objects presented were well corrected for distortion, and appeared reasonably sharp and recognizable in resulting photographs.

The described wide angle viewer, especially for perimeter observation as in periscopes or the like, is simple and effective and is conceived to have a wide variety of uses. These include desired observation in military or other kinds of vehicles, aircraft, marine vessels navigating above or below the surface, and the like. Similarly the system may be employed for photographic recording or transmission of images, as in space exploration or in Having completed a detailed description of the invention so that those skilled in the art could practice the same I claim:

1. A perimeter viewing system for viewing above and below a horizon at 90° to the optical axis of the system, said system comprising a sphere having an index of refraction of at least 1.8, a positive lens disposed on an optical axis with the sphere, said positive lens having an effective diameter at least 50% larger than that of the sphere, said positive lens having a front face disposed substantially contiguous to the rearmost boundary of the spherical surface of the sphere for receiving and refracting toward said optical axis rays which enter the sphere at angles in a range extending both above and below a horizon that is at 90° to said axis and which are refracted by the sphere toward said lens, means for mounting said sphere in front of said lens so that said sphere is exposed to receive and refract said rays from objects that are about 15° or more below said horizon, a cap mounted on the exposed face of said sphere and on its optical axis for blocking the entry of rays into said sphere that are substantially more than about 20° above said horizon, and optical means for forming an image from said refracted rays.

2. The viewing system as defined in claim 1, in which the sphere has an index of refraction of about 2 and said positive lens has an index of refraction of about 1.5.

3. A viewing system as defined in claim 2, in which said positive lens comprises at least one plano-convex component having its plane face forward and in abutment with the sphere.

4. An optical system as defined in claim 2, in which said positive lens comprises a pair of substantially identical plano-convex components having their convex surfaces closely spaced and facing each other.

5. The viewing system of claim 2, wherein said image forming means comprises a positive lens followed by a penta prism optically aligned with the lens for viewing said image by laterally directed visual observation.

References Cited

UNITED STATES PATENTS

| | | | |
|---|---|---|---|
| 1,716,668 | 6/1929 | Shore | 350—175 |
| 1,932,817 | 10/1933 | Gehrke | 350—229 X |
| 1,975,302 | 10/1934 | Van Albada | 350—175 |
| 2,603,128 | 7/1952 | Miles | 350—229 |
| 2,783,757 | 3/1957 | Scholz | 350—49 X |
| 3,182,576 | 5/1965 | Papke | 350—52 X |
| 3,404,934 | 10/1968 | Brachvogel et al. | 350—198 |

DAVID SCHONBERG, Primary Examiner

A. M. OSTRAGER, Assistant Examiner

U.S. Cl. X.R.

350—198, 202, 205, 229